United States Patent [19]
Linkner, Jr.

[11] Patent Number: 5,464,187
[45] Date of Patent: Nov. 7, 1995

[54] MOUNTING BRACKET FOR AN ANTI-LOCK BRAKE/TRACTION CONTROL SYSTEM CONTROL VALVE

[75] Inventor: Herbert L. Linkner, Jr., Dexter, Mich.

[73] Assignee: Kelsey-Hayes Company, Romulus, Mich.

[21] Appl. No.: 132,607

[22] Filed: Oct. 6, 1993

[51] Int. Cl.⁶ .................................................. F16M 13/00
[52] U.S. Cl. ........................... 248/635; 248/638; 248/675
[58] Field of Search ................................ 248/635, 634, 248/659, 638, 675, 605

[56] References Cited

U.S. PATENT DOCUMENTS

| | | | |
|---|---|---|---|
| 1,390,154 | 9/1921 | Neuteboom | 248/659 |
| 1,778,992 | 10/1930 | Wulfert | 248/635 |
| 1,798,719 | 3/1931 | Brump | 248/659 X |
| 3,841,426 | 10/1974 | Nemschoff | 248/659 X |
| 4,520,987 | 6/1985 | Eguchi | 248/638 X |
| 5,028,032 | 7/1991 | Peiler | 248/605 |
| 5,141,203 | 8/1992 | Baker | 248/638 |
| 5,303,896 | 4/1994 | Sterka | 248/638 X |
| 5,335,893 | 8/1994 | Opp | 248/632 X |

*Primary Examiner*—J. Franklin Foss
*Attorney, Agent, or Firm*—MacMillan, Sobanski & Todd

[57] ABSTRACT

A mounting bracket for an anti-lock brake/traction control system control valve including a three point suspension. The bracket includes a base portion adapted for attachment to a vehicle. Three supporting members extend perpendicularly from the base portion. Resilient annular isolators are disposed within apertures formed through two of the supporting members. Mounting pins for securing the control valve to the bracket are carried by the isolators. A third resilient isolator having a recess formed therein is carried by the third supporting member. An extended portion of the control valve is received in the isolator recess and supported thereby. The isolators cooperate with the mounting pins and the control valve extended portion to absorb acoustical and vibrational noise.

27 Claims, 5 Drawing Sheets

MOUNTING BRACKET FOR AN ANTI-LOCK BRAKE/TRACTION CONTROL SYSTEM CONTROL VALVE

BACKGROUND OF THE INVENTION

This invention relates in general to mounting brackets for anti-lock/traction control system control valves and in particular to a mounting bracket having a three point suspension which dampens acoustical and vibrational noise.

Anti-lock brake and traction control systems are becoming increasingly popular to maintain control of a vehicle under adverse operating conditions such as rain, snow or ice. Such systems typically include a plurality of solenoid valves that control application of the vehicle brakes to prevent wheel lock-up during braking. Many systems also include a motor driven reciprocating pump which supplies pressurized brake fluid for operation of the system. An example of a typical anti-lock brake system is disclosed in U.S. Pat. No. 4,865,399.

The anti-lock/traction control system solenoid valves, pump and motor are usually included in a control valve. The control valve typically has a valve body which receives the solenoid valves and pump and includes internal connecting passageways between the valves and pump. The pump motor is usually mounted upon the valve body and extends outwardly therefrom. The control valve is adapted to be connected to the vehicle hydraulic brake lines between the vehicle's master brake cylinder and the individual wheel brakes.

The control valve is typically attached to a vehicle with a mounting bracket. In prior art anti-lock/traction control systems, a unique mounting bracket has been designed for each specific control valve. Prior art mounting brackets typically include a base having a plurality of supporting members extending therefrom. Mounting apertures formed through the supporting members correspond to threaded holes formed in mounting bosses on the control valve surface. Bolts or other conventional threaded fasteners inserted through the bracket mounting apertures and received by the threaded holes in the control valve body secure the bracket to the valve body.

The mounting bracket base further includes a plurality of apertures formed therethrough allowing attachment of the bracket to the vehicle with conventional threaded fasteners. The control valve is typically mounted upon the vehicle cowl panel near the master brake cylinder to facilitate connection to the vehicle brake system. Spacers formed from an elastomeric material are typically between the mounting bracket base and the vehicle surface. Such spacers usually have an annular shape with an axial bore formed therethrough which receives the fasteners securing the bracket to the vehicle.

During anti-lock braking and traction control operational cycles, the operation of the valves, pump and motor generates control valve noise, which can be an irritant to vehicle occupants. The control valve noise includes several distinct components, one of which is hydraulic noise consisting of pressure variations in the brake fluid generated by the reciprocating pump and the opening and closing of the solenoid valves. Hydraulic noise, which can be transmitted through the brake fluid to the brake pedal, can be dampened by including a fluid attenuator in the control valve.

A second component of control valve noise produced by the motor, pump and valve operations is acoustical noise, which consists of sound energy transmitted through the air. Acoustical noise can be attenuated by application of sound absorbent insulation between the vehicle passenger compartment and the control valve.

A third component of control valve noise consists of vibrational noise which can be transmitted through vehicle body members to the passenger compartment. Furthermore, when the control valve is mounted upon the vehicle cowl panel, the cowl panel often functions as a drumhead, amplifying vibrations generated by the control valve components and transmitting the vibrations directly into the passenger compartment. The vibrations can cause other vehicle components to generate acoustical noise within the passenger compartment.

The vibrations are primarily generated by the rotation of the pump motor, the reciprocating movement of the pump pistons, and the operation of the solenoid valves. The vibrations consist of oscillating linear and rotational displacements of the valve body. The rotational displacements occur about an axis of rotation passing through the control valve center of gravity. The distances between each mounting bracket attachment point and the axis of rotation define moment arms about which the rotational displacements develop torques. The resulting torques can cause stresses at the bracket mounting points and large vibrations, especially if the moment arms are long.

The elastomeric spacers included between the mounting bracket and the vehicle are intended to absorb acoustical and vibrational noise.

SUMMARY OF THE INVENTION

The present invention is directed towards an improved anti-lock/traction control control valve mounting bracket having a three point suspension which dampens acoustical and vibrational noise.

As anti-lock brake/traction control systems are installed in smaller and lighter vehicles, the noise generated by the control valve components becomes more noticeable to the vehicle occupants. Typically, prior art mounting brackets are in direct contact with the mounting bosses formed in the surface of the control valve. Thus, noise is transmitted directly from the control valve to the mounting bracket.

Noise also is transmitted through the fasteners securing the mounting bracket to the vehicle. Particularly troublesome are vibrations, which continue to be transmitted through the bracket mounting fasteners when elastomeric spacers are placed between the bracket base and the vehicle surface. This is because the spacers are slightly compressed when the fasteners are tightened, causing a reduction in the capacity of the spacers to absorb vibrations. Similarly, compression of the spacers decreases the capability of the spacers to absorb acoustical noise. If the fasteners are not tightened sufficiently, the vibrations can cause the fasteners to work out of the mounting holes, loosening the bracket from the vehicle. Thus, there is a need for a control valve mounting bracket having an improved vibrational and acoustical noise dampening capability.

The present invention contemplates an improved control valve mounting bracket having three supporting members and means for dampening vibrational and acoustical noise generated by the control valve components. The bracket includes a base portion adapted to be attached directly to a vehicle by conventional fasteners. First and second supporting members extend perpendicularly from opposite sides of the base portion perimeter. The second supporting member is spaced sufficiently apart from the first supporting member to receive the control valve therebetween for mounting. A third supporting member extends perpendicularly from a portion of the base portion perimeter located between the first and second supporting members.

An aperture is formed through each of the first and second supporting members. These apertures define a primary axis of support which passes through the mounted control valve. When the control valve is positioned between the first and second supporting members, the primary axis passes through the control valve in the vicinity of the control valve center of gravity. The first and second supporting members and the apertures formed therein position the primary axis sufficiently close to the control valve center of gravity that at least 80 percent of the control valve weight is carried by the first and second supporting members.

A portion of the material forming the supporting member which surrounds each aperture is drawn outwardly to form a ferrule. A side isolator formed from a resilient material and having an axial bore formed therethrough is disposed within each of the apertures and frictionally retained in the ferrule. Each side isolator has a stepped exterior shape defining inner and outer portions. The inner portion has a larger diameter than the aperture. The isolator outer portion is received by the ferrule while the inner portion extends radially over a portion of the inner surface of the supporting member. A mounting pin adapted to be attached to the control valve is carried in each isolator bore. In the preferred embodiment, the portion of the mounting pin received by the isolator bore has a hexagonal shaped cross-section forming a surface having axial flats and edges. Only the pin axial edges contact the surface of the isolator bore. Each mounting pin includes a threaded portion which extends from the isolator bore and is received by a threaded hole formed in the control valve. Thus, the mounting pins and isolators in the first and second member apertures secure the control valve to the mounting bracket.

The third member also includes an aperture formed therethrough. An end isolator formed from a resilient material and having a closed outer end is carried by the aperture. The end isolator has an axial cylindrical recess formed therein which receives a boss formed in the end of the control valve pump motor. The end of the motor is supported by a plurality of radially inwardly extending axial tabs formed on the recess walls. The third member and end isolator support the control valve, carrying less than 20 percent of the control valve weight.

To use the improved bracket, the isolators are inserted into the apertures and the bracket is attached to the vehicle. The boss on the end of the pump motor is inserted into the end isolator recess and the control valve is positioned between the first and second supporting members. Mounting holes formed in the control valve body surface are aligned with the side isolator bores. The mounting pins are then inserted through the isolator bores and secured to the valve body.

Because the primary axis of support passes through the control valve near the center of gravity, the rotational torques caused by vibration are minimized, reducing the magnitude of the vibrations. Furthermore, because the first and second members support the majority of the control valve weight, the end isolator is designed to fit loosely about the motor end. The loose fit allows absorption of motor induced vibrations by the end isolator. Additionally, the small contact surface area between the mounting pin edges and the isolator bore surfaces significantly reduces the amount of vibration transmitted from the control valve to the vehicle. Transmission of acoustical noise from the control valve to the vehicle passenger compartment also is reduced by the resilient isolators.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
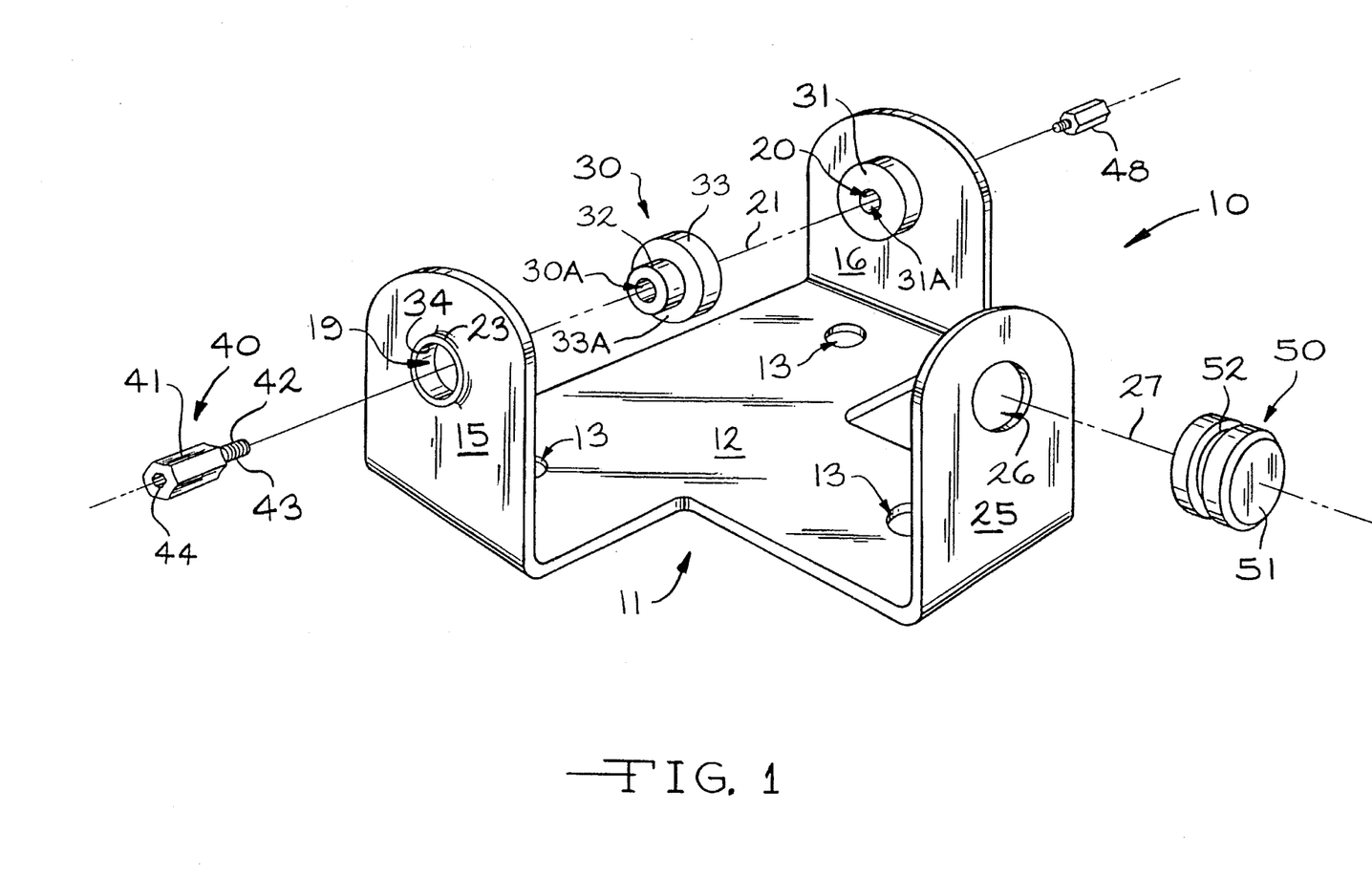
FIG. 1 is an exploded isometric view of a mounting bracket in accordance with the invention.
Figure 2:
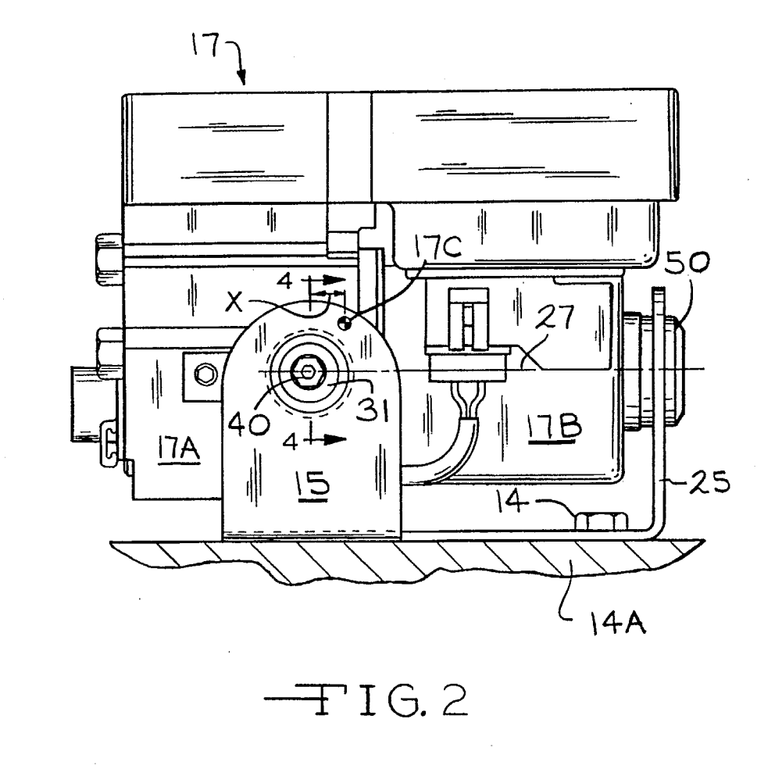
FIG. 2 is a left side elevational view of a control valve mounted on the bracket shown in FIG. 1.
Figure 3:
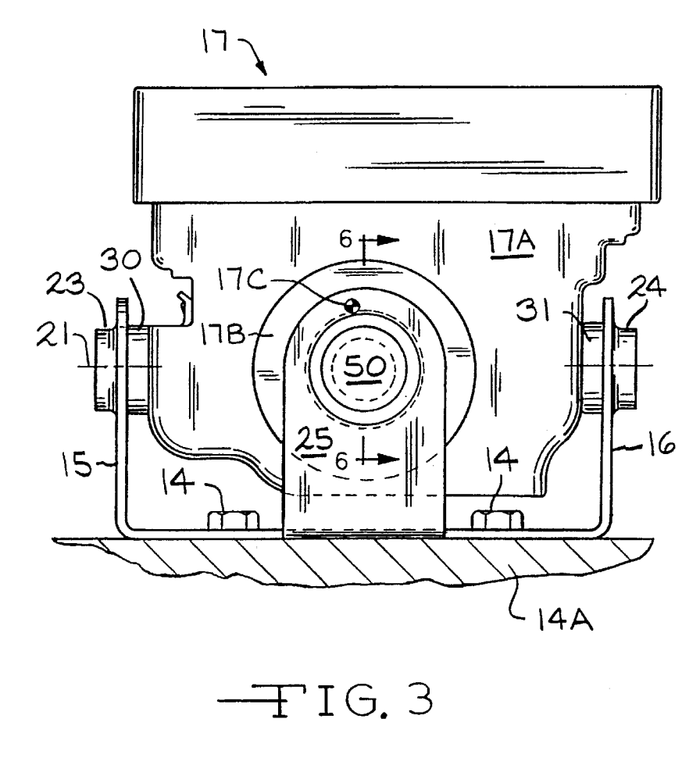
FIG. 3 is an front end elevational view of a control valve mounted on the bracket shown in FIG. 1.

Referring now to the figures, an improved control valve mounting bracket in accordance with the invention is shown generally at 10 in FIG. 1. The bracket 10 includes a support member 11 formed by conventional means, such as stamping and bending, from steel or another suitable material. The support member 11 includes a base portion 12 having a plurality of apertures 13 formed therethrough. As illustrated in FIGS. 2 and 3, the apertures 13 receive bolts 14, or other suitable fasteners, which secure the bracket 10 to a vehicle member 14A, such as a cowl panel. While the base portion 12 is shown in FIG. 1 as having a T-shape, it will be appreciated that the base portion 12 can have other shapes, such as, for example, a Y-shape. Additionally, while the base portion 12 is shown as being flat in FIGS. 1 through 3, the base portion 12 can be contoured to correspond to the shape of the vehicle member 14A to which the bracket 10 is attached.

First and second supporting members, or side members, 15 and 16 are formed extending upwardly in FIG. 1 from opposite sides of the base portion 12. In the preferred embodiment illustrated in FIGS. 1 through 3, the side members 15 and 16 are perpendicular to the base portion 12; however, the side members can be formed at other angles with the base portion 12. As best seen in FIG. 3, the side members 15 and 16 are spaced apart sufficiently for a anti-lock brake or traction control control valve 17 to be mounted therebetween. The control valve 17 includes a valve body 17A upon which is mounted a pump motor 17B. The pump motor 17B extends outwardly from the valve body 17A. The control valve 17 has a center of gravity indicated by the reference numeral 17C.

A first side aperture 19 is formed through the first side member 15. Similarly, a second side aperture 20 is formed through the second side member 16. The side apertures 19 and 20 define a primary axis 21, passing through the centers thereof. The supporting side members 15 and 16 and the corresponding side apertures 19 and 20 are formed such that, when the control valve 17 is mounted upon the bracket 10, the primary axis 21 passes through the control valve 17 within a predetermined distance, indicated as "X" in FIG. 2, of the control valve center of gravity 17C. The predetermined distance X is selected such that the axis 21 passes sufficiently close to the center of gravity 17C that at least 80 percent of the control valve weight is supported by the first and second members 15 and 16. In the preferred embodiment, the primary axis 21 is parallel to the plane of the base portion 12. As shown on the first side member 15 in FIG. 1, the side member material surrounding the side apertures 19 and 20 is drawn outward from the side members 15 and 16 to form ferrules, or collars, 23 and 24.

A third supporting member, or end member, 25 is formed extending upwardly in FIG. 1 from an end of the base portion 12. The end member 25 is illustrated in the preferred embodiment as being perpendicular to the base portion 12, however the end member 25 can be formed at another angle with the base portion 12. A third, or end, aperture 26 is formed through the end member 25. A secondary axis 27 passes through the center of the end aperture 26 parallel to the base portion 12. In the preferred embodiment, the end member is formed on the end of the base portion 12 such that the secondary axis 26, as shown in FIG. 2, extends along the pump motor axis. Also, as shown in FIGS. 2 and 3, the secondary axis 26 intersects the primary axis 21. However, depending upon the particular structure of the control valve 17, the secondary axis 26 may not intersect the primary axis 21.

The side apertures 19 and 20 receive first and second bushings, or side isolators, 30 and 31, respectively, formed from a resilient material. The resilient material is relatively soft, has a low spring rate, and, as will be explained below, absorbs both vibrational and acoustical noise. Additionally, the resilent material typically has different shear and compression characteristics. A synthetic rubber, such as neoprene, has been successfully used to form the side isolators 30 and 31.

Figure 4:
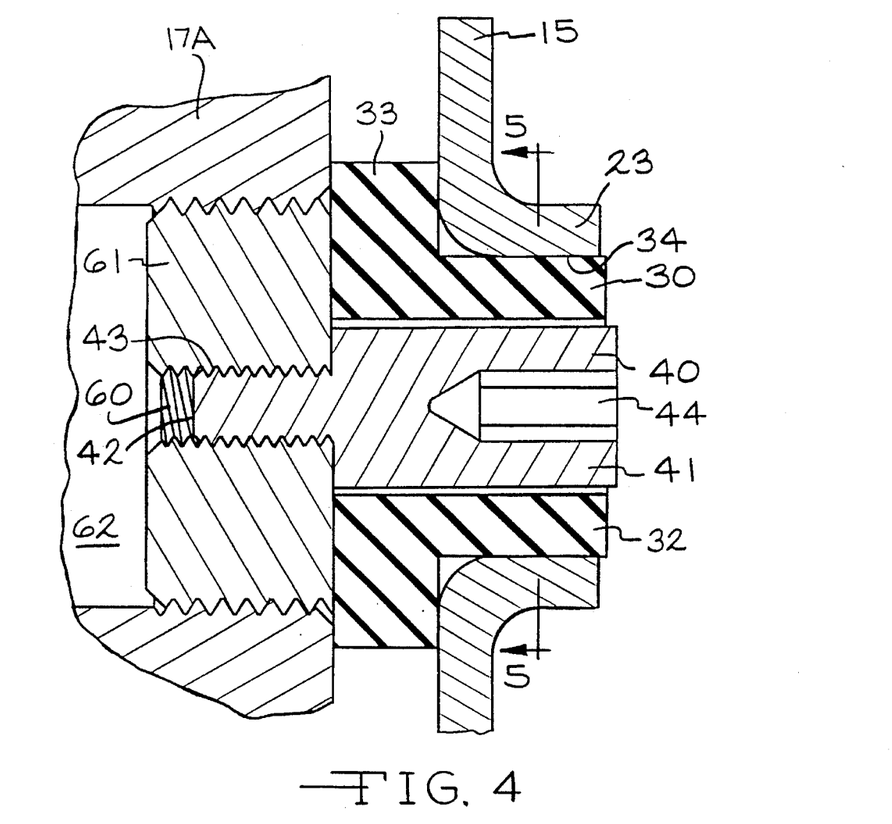
FIG. 4 is a partial sectional view taken along line 4—4 in FIG. 2.

The side isolators 30 and 31 have identical shapes, but are reversed for insertion into the side apertures 19 and 20. Constant diameter bores 30A and 31A extend axially through the isolators 30 and 31, respectively. As best seen in FIGS. 1 and 4, the first side isolator 30 has a stepped exterior surface defining an outer portion 32 and an inner portion 33. The inner portion 33 has a larger diameter than the outer portion 32, defining a shoulder 33A therebetween.

The outer portion 32 of the isolator 30 is received by the first side aperture 19 and the corresponding ferrule 23 from the inside of the first support member 15. The isolator outer portion 32 is supported and frictionally engaged by an inner surface 34 of the ferrule 23. The isolator shoulder 33A contacts the inner surface of the side member 15 and the isolator inner portion 33 extends radially thereacross. The bore 30A is concentric with the primary axis 21. Similarly, the second side isolator 31 is received by the second side aperture 20 and the corresponding ferrule 24 from the inside of the second support member 16, mirroring the first side isolator 30. As best seen in FIG. 3, when the control valve 17 is placed between the side members 15 and 16, the isolators 30 and 31 are retained therebetween.

Figure 5:
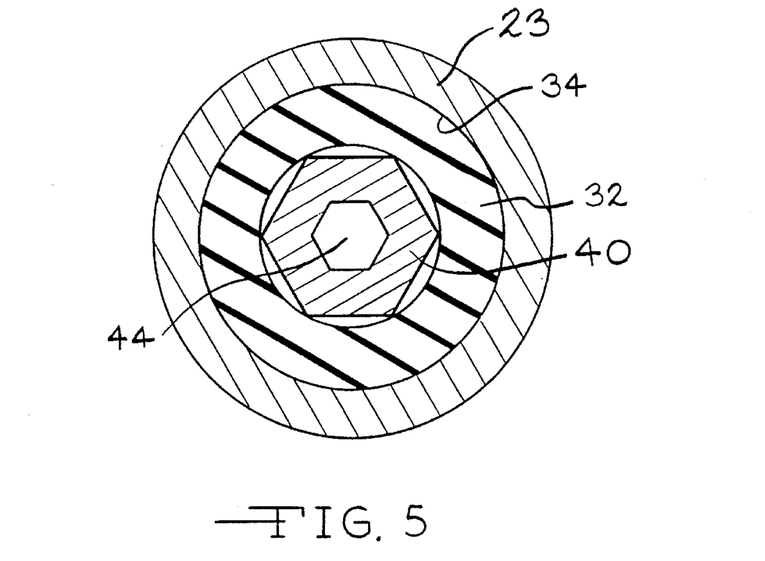
FIG. 5 is a sectional view taken along line 5—5 in FIG. 4.

A first mounting pin 40 is carried within the first side isolator bore 30A and extends therefrom. The mounting pin 40 includes an outer portion 41 which is received by the bore 30A. The outer portion 41 has a plurality of contiguous flat surfaces formed thereon which define a plurality of axial edges. The outer portion 41 is shown in FIGS. 1 and 5 as having a hexagon shaped cross-section. While a hexagon cross-section has been illustrated, it will be appreciated that the outer portion 41 can be formed having other cross-sectional shapes, including a circle, a triangle, a square and other polygons. In the preferred embodiment, the mounting pin outer portion 41 and the isolator bore 30A are sized for a friction fit therebetween. As best seen in FIG. 5, only the axial edges of the mounting pin outer portion 41 contact the surface of the isolator bore 30A.

The mounting pin 40 further includes a smaller diameter inner portion 42 having a threaded surface 43. The inner portion 42 is adapted for attachment to the valve body 17A. As explained below, the inner portion 42 is received by a threaded aperture formed in the surface of the valve body 17A. A hexagon shaped socket 44 formed in the outer end 41 of the mounting pin 40 is adapted to receive an Allen wrench (not shown) which is used to tighten the mounting pin 40 in the valve body aperture.

A similar mounting pin 48 is carried within the second side isolator bore 31A.

A third bushing, or end isolator, 50 formed from a resilient material is disposed in the end aperture 26. The resilient material is relatively soft, has a low spring rate and, as will be discussed below, absorbs both vibrational and acoustical noise. Additionally, the resilent material typically has different shear and compression properties. A synthetic rubber, such as neoprene, has been successfully used to form the end isolator 50.

Figure 6:
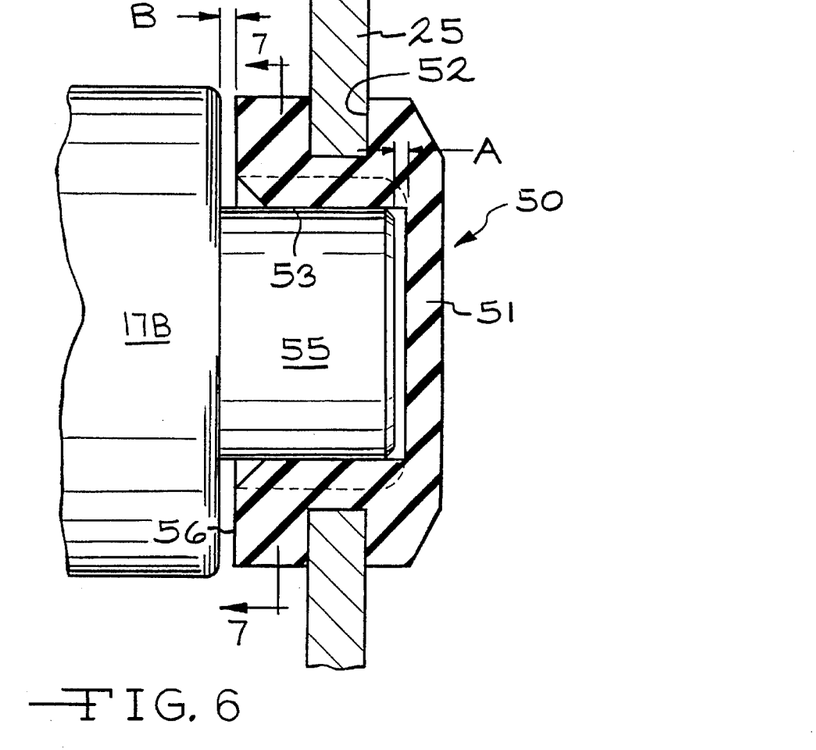
FIG. 6 is a sectional view of an end isolator taken along line 6—6 in FIG. 3.
Figure 7:
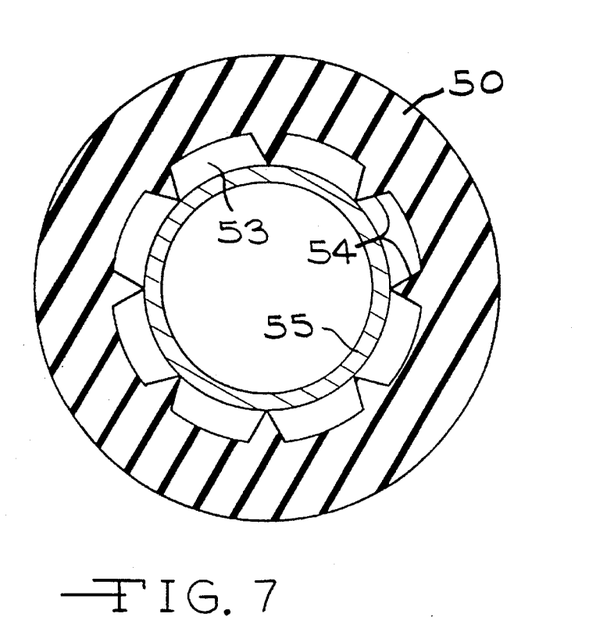
FIG. 7 is a sectional view taken along line 7—7 in FIG. 6.

For the preferred embodiment illustrated in FIGS. 6 and 7, the end isolator 50 includes a closed outer end portion 51 and has an annular circumferential groove 52 formed in the outer surface perpendicular to the isolator axis. The groove 52 receives the edge of the aperture 26 formed through the third support member 25 to retain the isolator 50 therein. As best seen in the sectional view of FIG. 6, the end isolator 50 further includes a cylindrical recess 53. A plurality of axial tabs 54 are formed upon the inner surface of the recess 53 and extend radially inward therefrom. As illustrated in FIG. 7, the tabs 54 have triangular cross-sections, although other cross-sectional shapes can be used.

To use the improved bracket and suspension 10, the isolators 30, 31 and 50 are inserted into the corresponding apertures in the support member 11. The bolts 14 are inserted through the apertures 13 formed in the base portion 12 and screwed into corresponding threaded holes (not shown) formed in the vehicle member 14A to secure the bracket 10 thereto. The control valve 17 is positioned with the valve body 17A between the first and second supporting members 15 and 16.

As illustrated in FIG. 6, a boss 55, formed on the outer end of the pump motor 17B, extends axially into the recess 53 and frictionally engages the edges of the tabs 54. However, the boss 55 does not extend fully into the recess 53, but defines a first space, labeled "A", between the outer end surface of the boss 55 and the inner surface of the isolator end portion 51. Additionally, the outer end surface of the motor 17B does not contact the inner surface of the end isolator 50. This defines a second space, labeled "B" in FIG. 6, between the motor 17B and the end isolator 50. Depending upon the motor structure, the sizes of the spaces A and B can be different. The spaces A and B allow the boss 55 to move axially within the recess 53 as the motor 17B vibrates.

The side isolator bores 30A and 31A are aligned with threaded mounting apertures formed in the surface of the valve body 17A. For the preferred embodiment illustrated in FIG. 4, a mounting aperture 60 is formed in a pump plug 61. The pump plug 61 is secured in the end of a bore 62 formed in the control valve body 17A which contains the anti-lock brake/traction control pump (not shown). Similarly a second mounting aperture is formed in a second pump plug (not shown) mounted on the opposite side of the valve body 17A. The mounting pins 40 and 48 are inserted through the isolator bores 30A and 31A and secured to the pump plugs to positively retain the valve body 17 in the bracket 10.

It is to be understood that while the mounting pin 40 is illustrated in FIG. 4 as being secured to a pump plug 60, other means for attaching the pin 40 to the control valve 17 can be used. Thus, the control valve body 17A can include a pair of surface mounting bosses (not shown) having threaded holes formed therein which receive the threaded inner ends of the mounting pins 40 and 48. Such mounting bosses and bolt holes are formed concentrically about the primary axis 21. The mounting pins 40 and 48 would be received by the mounting boss threaded holes to secure the control valve 17 to the bracket 10.

As explained above, the primary axis 21 defined by the side apertures 19 and 20 passes through the control valve 17 within a predetermined distance X from the control valve center of gravity 17C. In the preferred embodiment of the bracket 10, at least 80 percent of the weight of the control valve 17 is carried by the side members 15 and 16 and the side isolators 30 and 31. Accordingly, in the preferred embodiment, less than 20 percent of the weight is supported by the end member 25.

If the primary axis 21 is closer to the control valve center of gravity 17C, more control valve weight is carried by the side members 15 and 16 and isolators 30 and 31, and less weight is supported by the end member 25 and isolator 50. It has been found for a particular control valve, that when the predetermined distance X between the primary axis 21 and the control valve center of gravity 17C is less than 2 cm, 90 percent of the control valve weight is supported by side members 15 and 16. Thus, the control valve 17 is essentially balanced between the side members 15 and 16 and secured thereto by the mounting pins 40 and 48 while the end member 25 functions primarily to support the end of the motor 17B. If the predetermined distance X is zero, all of the weight of the control valve 17 is carried by the side members 15 and 16.

The closeness of the primary axis 21 to the center of gravity 17C reduces the length of moment arms for rotational forces about the axis 21. This, in turn, reduces the rotational stresses exerted upon the side members 15 and 16 and isolators 30 and 31 and the magnitude of the vibrations generated by the control valve components. Because of the low spring rate, the side isolators 30 and 31 absorb both vibrational and acoustical noise generated by the control valve components. Maximum effectiveness is obtained for damping acoustical and vibrational noise when the primary axis 21 passes through the center of gravity 17C, in which case the distance "X" is zero.

With the majority of the control valve weight being carried by the side members 15 and 16, the end member 25 and isolator 50 are subjected to minimal dynamic loading. Additionally, mounting pins 40 and 48 and the side isolators 30 and 31 limit the movement of the control valve 17 along the secondary axis 27. This allows the end isolator 50 to have a low spring rate and permits inclusion of the spaces A and B between the motor end and the isolator 50. The low spring rate and spaces A and B combine to provide optimum acoustical and vibrational noise absorption for the motor 17B.

The ferrules 23 and 24 increase the size of the bearing surfaces for the side isolators 30 and 31. This increases the durability of the bracket 10, allowing the bracket 10 to withstand higher vibrational loads and to be used with larger control valves (not shown). Thus, one size of support member 11 can be used with a number of different control valves by substituting different sized isolators, allowing a reduction in the number of different sizes of support members 11 needed. Additionally, the bracket 10 can be attached to a vehicle in any position since the isolators 30, 31 and 50 support the control valve 17 through a full 360 degree mounting orientation about any axis of the valve 17.

As described above, the resilient isolators 30, 31 and 50 suspend the control valve 17 within the support member 11, preventing the transmission of vibrational and acoustical noise therebetween. For the preferred embodiment illustrated in the accompanying figures, the isolators 30, 31 and 50 have non-linear spring rates. The isolators 30, 31 and 50 have a low spring rate during normal vehicle operation to absorb acoustical and vibrational noise generated by the control valve 17. However, if the vehicle is subjected to a sudden jarring motion, as is generated, for example, upon passing over a bump or hole in the road surface, the isolator spring rate increases to provide more support to the control valve 17.

The variable spring rate is provided for the side isolators 30 and 31 by the cooperation of the surface of the isolator bores 30A and 31A with the hexagon shaped mounting pins 40 and 48. As shown in FIG. 5, only the axial edges of the mounting pin outer portion 41 contact the surface of the bore 30A. Thus, only a small surface area of the mounting pin 40 is supported by the side isolator 30. The low spring rate of the resilient material used to form the side isolator 30 and the small surface contact area function to dampen mounting pin vibrations and absorb acoustical noise. However, upon subjecting the control valve 17 and support member 11 to a shock, as described above, the mounting pin 40 radially shifts within the bore 30A embedding a portion of the pin 40 in the isolator 30. This increases the supported surface area of the mounting pin 40 and raises the effective spring rate of the side isolator 30, providing a stiffer dampening response and provide more support to the control valve 17. The isolator spring rates also can be modified by using mounting pins (not shown) having outer portions formed with other cross-sectional shapes. Additionally, because the shear and compression properties of the material forming the side isolators 30 and 31 are different, the axial and radial spring rates are different for the side isolators 30 and 31.

A variable spring rate is provided for the end isolator 50 by the cooperation of the axial tabs 54 with the motor end boss 55. As shown in FIG. 7, only the edges of the tabs 54 contact the surface of the motor end boss 55. Thus, only a small surface area of the motor end boss 55 is supported by the end isolator 50. As mentioned above, the resilient material used to form the end isolator 50 is selected to provide a low spring rate. However, subjecting the assembled control valve and bracket to a shock, as described above, can radially shift the motor end boss 55 within the recess 53, compressing the contacted tabs. This increases the supported surface area of the motor boss end 55 and raises the effective spring rate of the end isolator 50, providing a stiffer dampening response and more support to the control valve 17. The isolator spring rate also can be modified by forming end isolator tabs (not shown) having other cross-sectional shapes. Additionally, because the shear and compression properties of the material forming the end isolator 50 are different, the axial and radial spring rates are different for the end isolator 50.

Figure 8:
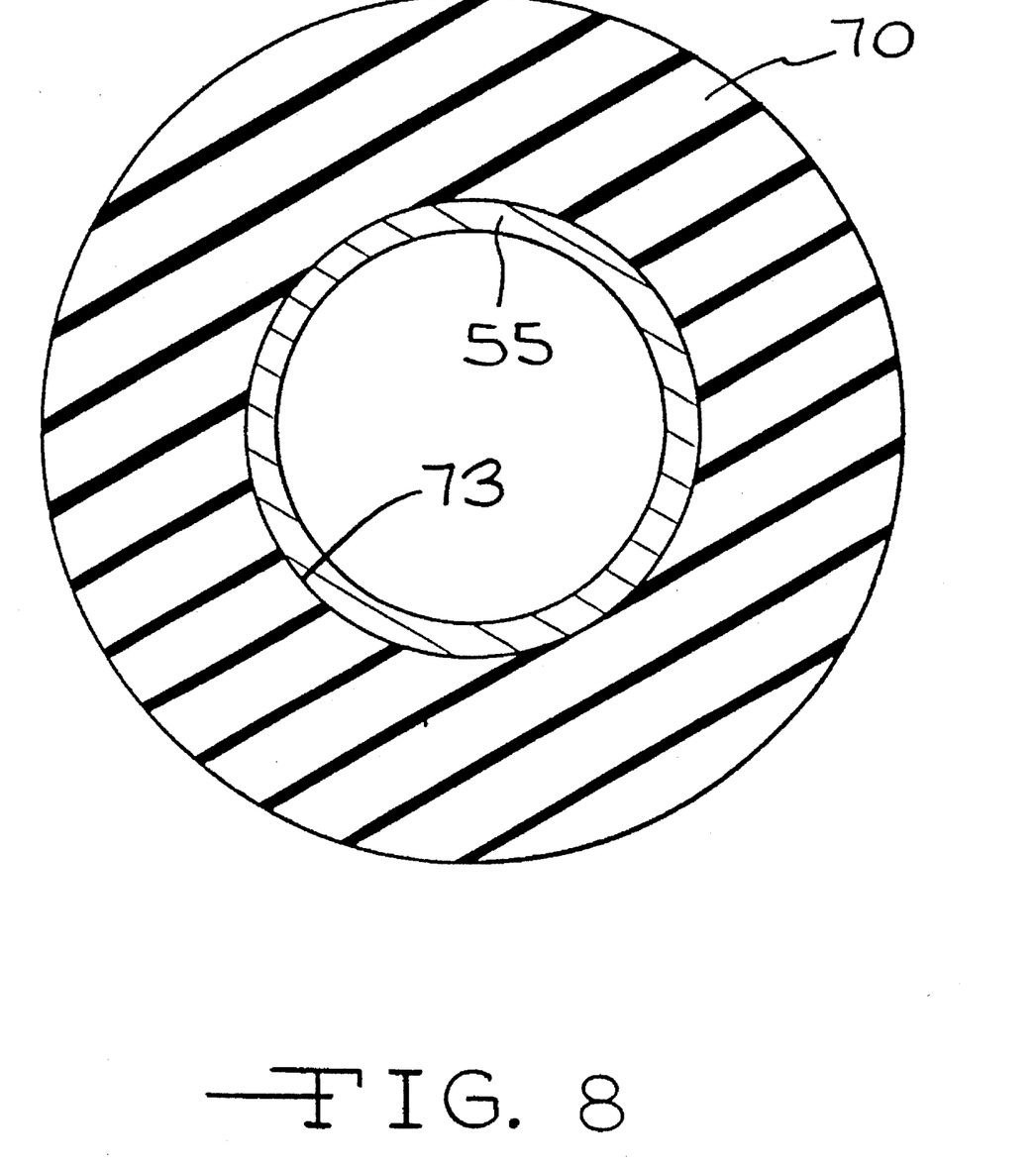
FIG. 8 is a sectional view of an alternate embodiment of the end isolator shown in FIG. 6 taken along line 7—7 in FIG. 6.

An alternate embodiment of an end isolator 70 is illustrated in FIG. 8. The alternate end isolator 70 includes a cylindrical recess 73 formed therein. The recess 73 has a smooth sidewall and does not include the axial tabs 54 formed in the recess 53 of the end isolator 50 described above. The boss 55 on the end of the pump motor 17B is frictionally received by the recess 63 and supported by the end isolator 60 in the end aperture 26.

An alternate embodiment of the bracket includes mounting pins 40 and 48 and side isolator bores 30A and 31A being sized such that a sliding fit is formed therebetween. This effectively changes the spring rates provided by the side isolators 30 and 31 and allows for tuning the bracket for optimum damping of acoustical and vibrational noise. Similarly, the end isolator 50 and pump motor end boss 55 are sized such that a sliding fit is formed therebetween. This also effectively changes the spring rate provided by the isolator 50 and allows further tuning the bracket for optimum damping of acoustical and vibrational noise.

In accordance with the provisions of the patent statutes, the principle and mode of operation of the invention have been explained and illustrated in its preferred embodiment. However, it must be understood that the invention may be practiced otherwise than as specifically explained and illustrated without departing from its spirit or scope.

What is claimed is:

1. A mounting bracket for attaching an anti-lock brake/traction control system control valve to a vehicle, the mounting bracket comprising:

a base portion adapted to be attached to a vehicle;

first and second supporting members extending from said base portion, said second supporting member spaced apart from said first supporting member, said first and second members adapted to carry more weight than a first predetermined percentage of the weight of the control valve, said first and second supporting members including means adapted for securing the control valve therebetween, said means for securing including an aperture formed through said first supporting member, said means for supporting further including an isolation means formed from a resilient material disposed within said aperture, said isolation means having an axial bore formed therethrough, said bore receiving a mounting pin, said mounting pin including a portion extending from said bore and adapted to be attached to the control valve; and a third supporting member extending from said base portion in the same direction as said first and second members and spaced apart therefrom, said third supporting member adapted to carry less than a second predetermined percentage of the control valve weight.

2. A bracket as described in claim 1, wherein said first predetermined percentage is greater than 80 percent and second predetermined percentage is less than 20 percent.

3. A bracket as described in claim 1, wherein said first predetermined percentage is greater than 90 percent and second predetermined percentage is less than 10 percent.

4. A bracket as described in claim 1, wherein at least one of said supporting members is perpendicular to said base portion.

5. A bracket as described in claim 1, wherein said base portion has a T-shape.

6. A bracket, as described in claim 1, wherein said first supporting member includes a collar formed about said aperture, said collar supporting said isolation means.

7. A bracket, as described in claim 1, wherein said resilient material is neoprene.

8. A bracket, as described in claim 1, wherein said mounting pin includes an outer portion having a plurality of contiguous axial flat surfaces formed thereupon, said flat surfaces defining a plurality of axial edges, and further wherein said outer portion is received in said isolation means bore with at least one of said mounting pin axial edges contacting said bore.

9. A bracket, as described in claim 8, wherein said outer portion has a hexagonal cross-section.

10. A bracket, as described in claim 1, wherein said mounting pin includes an outer portion having a circular cross-section, and further wherein said outer portion is received in said isolation means bore.

11. A bracket, as described in claim 1, wherein said mounting pin is frictionally retained in said isolation means bore.

12. A bracket, as described in claim 1, wherein said third supporting member includes means adapted for supporting the control valve.

13. A bracket, as described in claim 12, wherein said means for supporting includes an aperture formed through said third supporting member, said means further including an end isolation means formed from a resilient material disposed within said aperture, said end isolation means having an axial recess formed therein, said recess adapted to receive a portion of the control valve.

14. A bracket, as described in claim 13, wherein said resilient material is neoprene.

15. A bracket, as described in claim 13, wherein said recess has a cylindrical shape.

16. A bracket, as described in claim 15, wherein said end isolation means further includes a plurality of axial tabs formed on a surface of said recess, said tabs extending radially into said recess and adapted to support said portion of the control valve.

17. A bracket, as described in claim 16, wherein said tabs have a triangular cross-sectional shape.

18. A mounting bracket for attaching an anti-lock brake/traction control system control valve to a vehicle, the control valve having a center of gravity, the mounting bracket comprising:

a base portion adapted to be attached to a vehicle;

first and second supporting members extending from said base portion, said first member having a first aperture formed therethrough and said second member having a second aperture formed therethrough, said first and second apertures defining an axis, said first and second supporting members adapted to receive the control valve therebetween with said axis passing through the control valve within a predetermined distance from the control valve center of gravity;

means disposed in said first and second apertures adapted for securing the control valve between said first and second supporting members;

a third supporting member extending from said base portion, said third member having a third aperture formed therethrough; and means disposed in said third aperture adapted for supporting a portion of the control valve.

19. A bracket as described in claim 18, wherein said predetermined distance is less than two centimeters.

20. A bracket, as described in claim 18, wherein said predetermined distance is zero.

21. A bracket, as described in claim 18, wherein said means for securing includes an isolation means formed from a resilient material and having an axial bore formed therethrough, said isolation means being disposed within said first aperture with said bore concentric with said axis, said isolation means bore carrying a mounting pin adapted to be attached to said control valve.

22. A bracket, as described in claim 18, wherein said means for supporting includes an end isolation means formed from a resilient material disposed within said third aperture, said end isolation means having a recess formed therein, said recess adapted to receive the portion of the control valve.

23. A mounting bracket for attaching an anti-lock brake/traction control system control valve to a vehicle, the mounting bracket comprising:

a base portion adapted to be attached to a vehicle;

first and second supporting members extending from said base portion, said first and second members adapted to carry more weight than a first predetermined percentage of the weight of the control valve; and a third supporting member extending from said base portion in the same direction as said first and second members and spaced apart therefrom, said third supporting member adapted to carry less than a second predetermined percentage of the control valve weight, said third supporting member including means adapted for supporting the control valve, said means for supporting including an aperture formed through said third supporting member, said means for supporting further including an end isolation means formed from a resilient material disposed within said aperture, said end isolation means having an axial recess formed therein, said recess adapted to receive a portion of the control valve.

24. A bracket, as described in claim 23, wherein said resilient material is neoprene.

25. A bracket, as described in claim 23, wherein said recess has a cylindrical shape.

26. A bracket, as described in claim 25, wherein said end isolation means further includes a plurality of axial tabs formed on a surface of said recess, said tabs extending radially into said recess and adapted to support said portion of the control valve.

27. A bracket, as described in claim 26, wherein said tabs have a triangular cross-sectional shape.

* * * * *